(12) United States Patent
Shteyn

(10) Patent No.: US 7,092,861 B1
(45) Date of Patent: Aug. 15, 2006

(54) VISUAL ANTI-VIRUS IN A NETWORK CONTROL ENVIRONMENT

(75) Inventor: Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1013 days.

(21) Appl. No.: 09/704,489

(22) Filed: Nov. 2, 2000

(51) Int. Cl.
*G06G 7/48* (2006.01)

(52) U.S. Cl. .......................................... 703/6; 713/188
(58) Field of Classification Search .................. 703/17, 703/6, 22; 700/97; 705/8; 702/81; 709/201; 717/115; 713/188
See application file for complete search history.

(56) References Cited

U.S. PATENT DOCUMENTS

| | | | | |
|---|---|---|---|---|
| 4,092,716 A | * | 5/1978 | Berg et al. ....................... | 701/3 |
| 5,369,570 A | * | 11/1994 | Parad ............................. | 705/8 |
| 5,398,196 A | | 3/1995 | Chambers .................... | 364/550 |
| 5,398,336 A | * | 3/1995 | Tantry et al. ........... | 707/103 R |
| 5,684,957 A | | 11/1997 | Kondo et al. | |
| 5,796,951 A | | 8/1998 | Hamner et al. | |
| 6,460,002 B1 | * | 10/2002 | Bone et al. .................... | 702/81 |
| 6,556,959 B1 | * | 4/2003 | Miller et al. .................... | 703/2 |
| 6,594,535 B1 | * | 7/2003 | Costanza ...................... | 700/97 |

OTHER PUBLICATIONS

Henning R R et al: "The Network Vulnerability Tool (NVT)—A System Vulnerability Visualization Architecture" National Information Systems Security Conference, XX, XX, vol. 1, Oct. 18, 1999, pp. 97–111, XP001031568 p. 99, right–hand col., paragraph II–p. 100, right–hand col., line 7 p. 101, left–hand col., paragraph II.1–p. 102, right–hand col., line 12 p. 104, left–hand col., line 17–p. 105, left–hand col., line 9 p. 106, left–hand col., paragraph IV–right–hand col., line 46.

\* cited by examiner

*Primary Examiner*—Albert W. Paladini
(74) *Attorney, Agent, or Firm*—Larry Liberchuk

(57) ABSTRACT

To detect a potential virus-infected control script in a networking system, visual representations of control structures and operations effected by a suspect script are presented to a user. A visual representation of the control links that are contained within the suspect script is presented to the user, preferably in a manner such that inappropriate links and/or device states are easily recognized. To further assist in the identification of potential aberrant behavior, a manual or automated simulation process allows the user to visually observe the changes of state of appliances in response to control stimuli, based on the instructions contained in the suspect script. In addition to facilitating an identification of a virus-infected script, the visual representation of the control structure of the network described by the script, and the simulation or emulation of this control structure, also facilitates the development and de-bugging of well-mannered control scripts, particularly in a home or office networking system. A third-party provider may provide the visual representation and/or the simulation process, in return for information regarding the inventory of equipment at the user's site, to facilitate marketing opportunities.

22 Claims, 3 Drawing Sheets

VISUAL ANTI-VIRUS IN A NETWORK CONTROL ENVIRONMENT

BACKGROUND OF THE INVENTION

1. Field of the Invention

This invention relates to the field of control networking, and in particular to the detection of a potential virus in a control script.

2. Description of Related Art

Conventional anti-virus programs look for particular patterns or blocks of code in suspect programs, such as any program downloaded from the Internet, received via an e-mail application, loaded from a removable disk, and so on. When a block is recognized that matches the "signature" of a known or hypothesized virus, the suspect program is determined to contain a virus. Depending upon the user preferences, the virus detecting program will either delete the block, delete the entire program, or provide the user with disposition options. Similar pattern matching techniques are used for detecting viruses in scripts, or macros, that are attached to data files.

Emulation programs are also used to detect potential viruses, as exemplified by U.S. Pat. No. 5,398,196, "METHOD AND APPARATUS FOR DETECTION OF COMPUTER VIRUSES", issued 14 Mar. 1995 to David A. Chambers, which is incorporated by reference herein. In this referenced patent, the antivirus program maintains variables corresponding to the CPU registers and emulates procedures corresponding to the CPU instructions contained in the suspect program. A monitor program evaluates the result of each CPU instruction between each instruction set to detect aberrant or dangerous behavior, based on 'intelligent' rules and procedures, such as a procedure that detects the replication of code, or a procedure that detects a modification of program code, based on the observation that convention programs do not replicate themselves, nor do they modify program code. As discussed in the referenced patent, other virus detecting techniques include behavior monitors, checksum monitors, digital signature verification, and the like.

Home or office networking systems provide a unique opportunity for ill-intentioned programmers to wreak havoc. The HAVi architecture, the Home API initiative and UPnP, the Universal Serial Bus (USB), HomeRF Lite, and the Bluetooth standard, each involving substantial contributions from Philips Electronics, the Jini technology of Sun Microsystems, Inc., and others, have been developed to enhance the interoperability of multiple devices in a network. In a conventional home or office networking system, explicit or implicit links are created among devices on one or more networks, wherein the state of one device, such as a control device, effects an operation by another device, such as a home appliance. Increasingly, programs and techniques are being developed to effect a high degree of automated control, including, for example, activating devices based on user habits or preferences, and/or user commands or gestures, and so on. Typically, small office or home network users usually lack the technical skills and/or technical support, necessary for a thorough evaluation of third-party software.

Generally, networking is effected by providing a mapping function that links one device's state to another's. In the Home API system, an example mapping function is the "AddRoute" function:

root.AddRoute (device1, stateA, device2, stateB).

This AddRoute function provides a control route between device1 and device2, such that, if device1 is in stateA, device2 is placed into stateB. An example AddRoute mapping may be:

root.AddRoute (switch, "power-on", light, "bright").

This example AddRoute function effects a link between the switch device and the light device, such that when the switch is in the "power-on" state, the light is placed in the "bright" state. Each time a device changes state, it reports its new state to all the devices on the net. Devices that have been linked to the device whose state has changed then determine whether they need to change state to correspond to the reported changed state. In some systems, each device monitors the states of other devices and effects its required changes directly; in other systems, one or more controllers monitor the states of devices on the network, and effect the required changes via commands to the controlled devices.

In like manner, a UPnP network effects control by having devices advertise their services, and also provide the commands necessary to effect each service, including providing a "presentation" page for presentation to a potential user. In this manner, a user control point (UCP) can provide an interface for a user, or another application program, to control the device. UPnP enabled devices, UCPs and/or software applications may receive notifications about status changes in other devices and/or services using the subscription protocol defined by the UPnP architecture. The Microsoft WindowsME operating system allows users to enable the UPnP functionality and control networked devices via the "My Network Places" folder. Other network systems employ other schemes for describing the structure and functions of a control network, such as JavaScript, VB script, and the like. The eXtensible Mark-up Language (XML) is also often used to create control system definitions and to describe control system configurations. XML files may also contain script elements, written, for example, in JavaScript, VBscript, and others.

For convenience, the term "script" is used hereinafter to define one or more commands, instructions, data sets, and so on, that, when executed or processed, effect a control or monitor function with regard to one or more devices and/or services. Each control network architecture provides a method for defining the mapping among states of devices, as well as methods for effecting an intended control of a device and/or service. These methods allow the network control logic to be expressed via scripts, and are collectively referred to as scripting methods.

A virus program can easily provide a script that effects aberrant behavior, such as controlling a device that does not logically correspond to the state of another device, or controlling a device contrary to the logical correspondence to another device. For example, in a typical home control network, a music system may be programmed via a script to be turned off whenever a particular television system is turned on. A virus program may introduce a link that turns the music system on whenever the television system is turned on, or after an $n^{th}$ channel-change on the television, or whenever a garage door is opened, or whenever a telephone call is received, and so on. In like manner, aberrant behavior can be induced via a virus that introduces changes to the advertising, control, or other UPnP scripts associated with a device, or via changes to the URLs that provide the address of the appropriate scripts corresponding to the controlled device.

A virus-induced script, however, will not necessarily have a characteristic "signature" that can be detected via a pattern matching scheme, nor a characteristic "behavior" that can be detected by a convention emulation system. For example, a script that changes a channel of a networked television provides a useful function, when executed in accordance with a user's intent. The same script, executed randomly by a virus, will be disruptive, and may force a user to discontinue the use of the network until the problem is resolved. Critical to the operation of a conventional emulation system is the recognition of behavior that can be considered aberrant or dangerous, such as computer commands that effect wide-scale deletions of files, or the characteristic replication and program-modification effects of virus programs, discussed above.

In like manner, inappropriate scripts, such as scripts prepared for a different target system, or scripts that are incompatible with a user's existing system, can wreak havoc on the user's networking system. Relatively minor incompatibilities, such as the use of a device-name in the script that corresponds to a different device having the same device-name in the user's existing network, can have major consequences. Such scripts are difficult to detect as being problematic, because they may work properly on one particular system configuration, and improperly in another.

BRIEF SUMMARY OF THE INVENTION

It is an object of this invention to provide a method and system to facilitate the detection of aberrant control scripts. It is a further object of this invention to provide a method and system that facilitates rational control of devices in a user network. It is a further object of this invention to provide a method and system that facilitates a verification of a control scheme in a user's network environment.

These objects and others are achieved via a variety of techniques, each related to a visual presentation to a user. A visual representation of the control links that are contained within a suspect script is presented to the user, preferably in a manner such that inappropriate links are easily recognized. To further assist in the identification of potential aberrant behavior, a manual or automated simulation process allows the user to visually observe the changes of state of appliances in response to control stimuli, based on the instructions contained in the suspect script. In addition to facilitating an identification of a virus-infected script, the visual representation of the control structure of the network described by the script, and the simulation or emulation of this control structure, also facilitates the development and de-bugging of well-mannered control scripts, particularly in a home or office networking system.

An Internet or a private WAN-based service may also host a script execution environment. Optionally, the service may have some prior knowledge about the user's equipment and/or network configuration. In another aspect of the invention the user can be provided with the option to observe in parallel the visual results of the emulation system and the results and/or interfaces provided by the script. The user is able to detect significant differences in the presented results in order to prevent interface "spoofing" by the script in question. In return for this anti-virus service, the service provider receives information about the user's existing equipment and environment, and can use this information to facilitate targeted advertisements for equipment or services related to the user's existing system.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

This invention is based on the observation that although a "proper" and "aberrant" control behavior effected via a script is difficult, if not impossible, to determine algorithmically, or based on signatures or other characteristics, a user will typically be able to distinguish proper and aberrant control via a visual representation of the information contained in the script. For example, if, in a graphic presentation, a link is shown between a garage door opener and a telephone, an observant user will detect a potential problem that requires further investigation, or the deletion or modification of the script.

For ease of reference and understanding, the invention is presented herein using the paradigm of an anti-virus system, without implying a limitation to the scope of the claimed invention to this particular application. As will be evident to one of ordinary skill in the art, the invention provides a method for visually verifying the structure and operation of a control script, and as such, is suitable for use in other than anti-virus applications, such as for control script development and de-bug.

Figure 1:
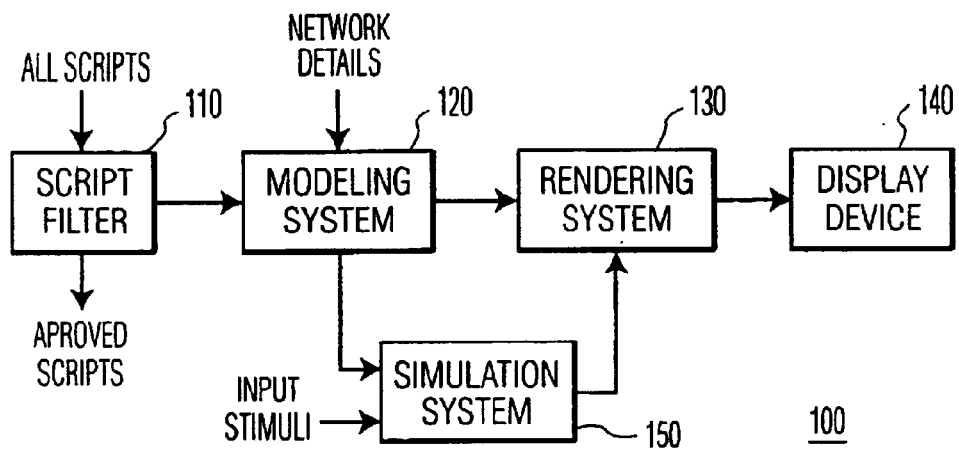
FIG. 1 illustrates an example block diagram of a visual anti-virus system in accordance with this invention.

FIG. 1 illustrates an example block diagram of a visual anti-virus system 100 in accordance with this invention. A script filter 110 selects a target script and submits it to a modeling system 120. The script filter 110 uses conventional anti-virus criteria for determining which scripts are potentially suspect. For example, a conventional anti-virus system scans all executable files that are down-loaded from the Internet, or loaded from a removable media, such as a diskette or CD. Conventional systems also allow a user to select specific target files, or groups of files, for a virus scan. In like manner, the filter 110 in a preferred embodiment selects scripts that are downloaded from the Internet or loaded from a removable media, and also allows a user to select particular files as suspect files.

The modeling system 120 creates a model of the control system that is described in the suspect script. The modeling system 120 creates a network description corresponding to the control structure that is described by the suspect script. The network description includes a connectivity list describing links among, primarily, three types of elements: control elements, controlled elements, and combination control/controlled elements. Optionally, the created network description may correspond to a conventional network description standard, thereby providing compatibility with other systems. In a preferred embodiment, the modeling system 120 is also provided access to the details of a user's existing system, to place the suspect control script in context, as required. For example, a user may configure the modeling system 120 to model the user's existing system as well as the control structure defined in the suspect script, to identify potential conflicts between the script and the user's existing system. In like manner, the modeling system 120 can verify a consistency between the properties and attributes of the user's existing system and the properties and attributes contained in the suspect script, and in particular verifying a correspondence among the properties and attributes that affect control functions.

The modeling system 120 provides the network description to a rendering system 130, which produces an image for display on a display device 140. If the network description conforms to an existing standard, the rendering system 130 may be a conventional network display system, such as a CAD (Computer Aided Design) schematic capture system. Alternatively, the rendering system 130 may be custom designed to produce images that are particularly well suited for displaying control structures. Generally, the rendering system 130 is configured to provide a graphic display of the described network, although other displays of control structures, such as a text listing of each control element and the controlled elements that it controls, with sub-listings for hierarchical structures, and cross-reference lists of each controlled element and the elements that control it, and so on. A spread-sheet rendering may also be used, to facilitate subsequent alternative analyses, sorting, and so on, by the user. As noted above, a graphic rendering is typically preferred, wherein the network description is presented as a schematic, a directed network graph, and so on. In another aspect of the invention the user can be provided with the option to observe in parallel the visual results of the emulation system, e.g. web pages reflecting the state of devices, and the results and/or interfaces provided by the script. The user is enabled to detect significant differences in the presented results in order to prevent interface "spoofing" by the script in question.

As will be evident to one of ordinary skill in the art, the components of the system 100 may be distributed, and the functions provided by each of the components may be distributed differently than illustrated by the example block diagram of FIG. 1. For example, an Internet or a private WAN-based service can host a script execution environment.

Figure 2:
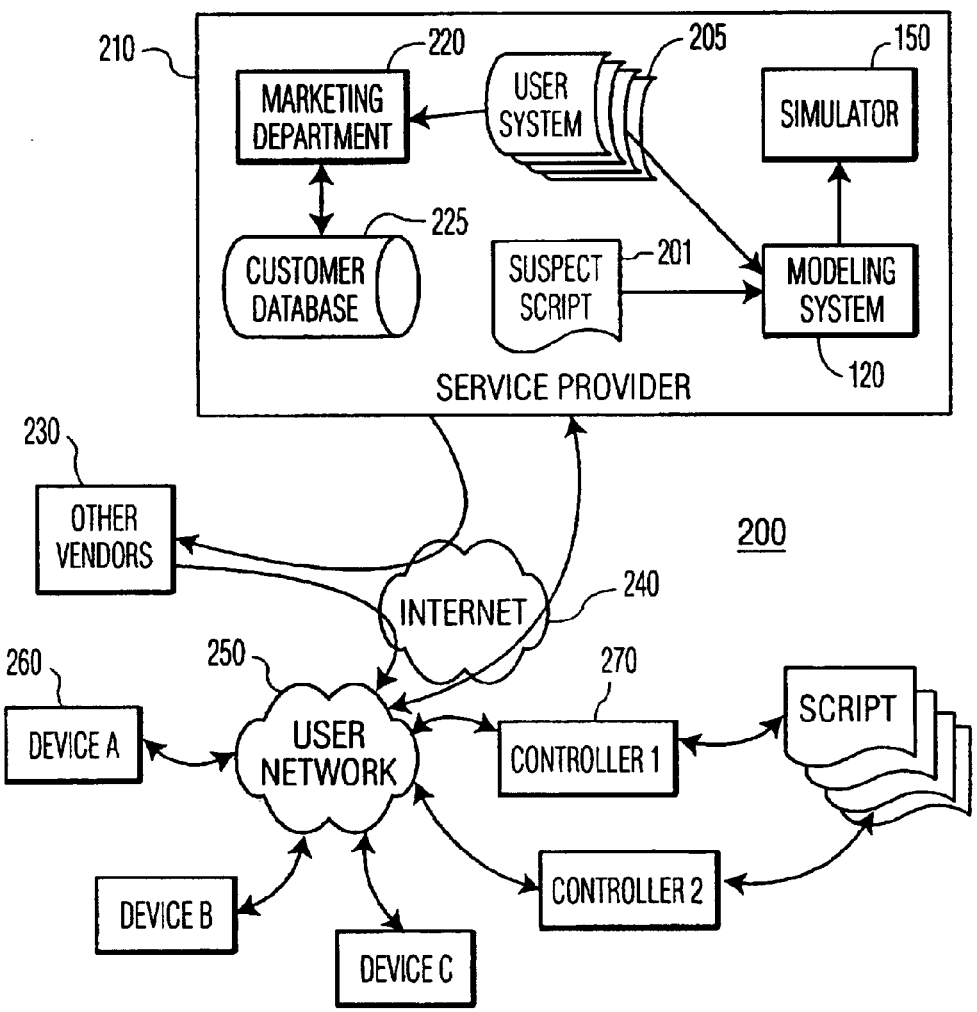
FIG. 2 illustrates an example block diagram of a service provided anti-virus system in accordance with this invention.

FIG. 2 illustrates an example block diagram of a service provided anti-virus system 200 in accordance with this invention. In this example embodiment, a service provider 210 hosts the modeling system 120 and/or the simulator 150, and provides the anti-virus services discussed herein via an Internet 240 or other connection with a user. Illustrated in FIG. 2, the suspect script 201 is provided to the service provider, as well as information 205 regarding the user's system that may be relevant to the proper operation of the suspect script 205. This information 205 may be specific to the modeling 120 and simulation 150 systems, or it may be information 205 that has been collected from the user from other applications, or a combination of both.

Copending U.S. patent application, U.S. Ser. No. 09/160, 490, filed Sep. 25, 1998 for Adrian Turner et al., incorporated by reference herein, discusses a server system that maintains a user profile of a particular end-user of consumer electronics network-enabled equipment and a data base of new technical features for this type of equipment. If there is a match between the user-profile and a new technical feature, and the user indicates to receive information about updates or sales offers, the user gets notified via the network of the option to obtain the feature. Similarly, copending U.S. patent application, U.S. Ser. No. 09/189,535 filed Nov. 10, 1998 for Eugene Shteyn, "UPGRADING OF SYNERGETIC ASPECTS OF HOME NETWORKS", incorporated by reference herein, relates to a server that has access to an inventory of devices and capabilities on a user's home network. The inventory is, for example, a look-up service as provided by HAVi or Jini architecture. The server has also access to a data base with information of features for a network. The server determines if the synergy of the apparatus present on the user's network can be enhanced based on the listing of the inventory and on the user's profile. If there are features that are relevant to the synergy, based on these criteria, the user gets notified. Copending U.S. patent application, U.S. Ser. No. 09/519,546 filed Mar. 6, 2000 for Erik Ekkel et al., "PERSONALIZING CE EQUIPMENT CONFIGURATION AT SERVER VIA WEB-ENABLED DEVICE", incorporated by reference herein, relates to facilitating the configuring of CE equipment by the consumer through delegating this configuring to an application server on the Internet. The consumer enters his/her preferences in a specific interactive Web page through a suitable user-interface of an Internet-enabled device, such as a PC or set-top box or digital cellphone. The application server generates the control data based on the preferences entered and downloads the control data to the CE equipment itself or to the Internet-enabled device. Copending U.S. patent application, U.S. Ser. No. 09/635,549 filed Aug. 10, 2000 for Eugene Shteyn, "TOPICAL SERVICE PROVIDES CONTEXT INFORMATION FOR A HOME NETWORK", incorporated by reference herein, relates to a consumer apparatus that has been made an intuitive component of a user-interface to a topical server. A specific user-interaction with the apparatus or its proxy on the home network causes a request to be sent to a specific server on the Internet based on a predefined URL. The home network receives a particular web page from the server with content information dedicated to the context of use of the apparatus.

In accordance with one aspect of this invention, when the suspect script 201 is submitted to the service, the simulator 150 emulates the user's network by creating software representations for relevant control 270 and controlled 260 devices and/or services. The audio/visual results of the script execution steps are presented to the user as web pages, via the network 240. The user is enabled to interact with the service in order to determine the effects of the script 201. After the script 201 is evaluated, it can be effected in the user's network.

The anti-virus modeling and/or simulating service may be provided by a service provider for a fee, or, in return for permission to use any information provided by the user to use the service. Copending U.S. patent application, U.S. Ser. No. 09/653,784 filed Sep. 1, 2000 for Frank Caris et al., "STB CONNECTS REMOTE TO WEB SITE FOR CUSTOMIZED CODE DOWNLOADS", incorporated by reference herein, discusses a business model wherein users are provided customized downloads for their equipment, in return for the use of the information provided by the user. The provider uses the information to create demographic models, to provide target advertising, to provide specific help for reported problems, and so on.

Illustrated in FIG. 2, the information 205 regarding each user's system is provided to a marketing group 220 at the service provider 210, and/or provided to marketing, sales, or service personnel at other vendors 230. This information 205 is generally used to create or augment a customer database 225 that can arranged and accessed for demographic, advertising, and other purposes, to facilitate a marketing or sales process. The service provider 210 and vendors 230 subsequently communicate with the user, in an attempt to facilitate the purchase of other services and devices, based on a knowledge of the user's existing system. For example, a user that has a collection of high quality audio-video equipment may receive advertisements for HDTV-compatible display systems, whereas a user that already has an HDTV-compatible display may receive advertisements for a subscription to a cable or satellite service that provides HDTV-quality broadcasts. The advantageous use of information regarding a user's inventory of equipment will be evident to one of ordinary skill in the art of marketing and sales.

Figure 3A:
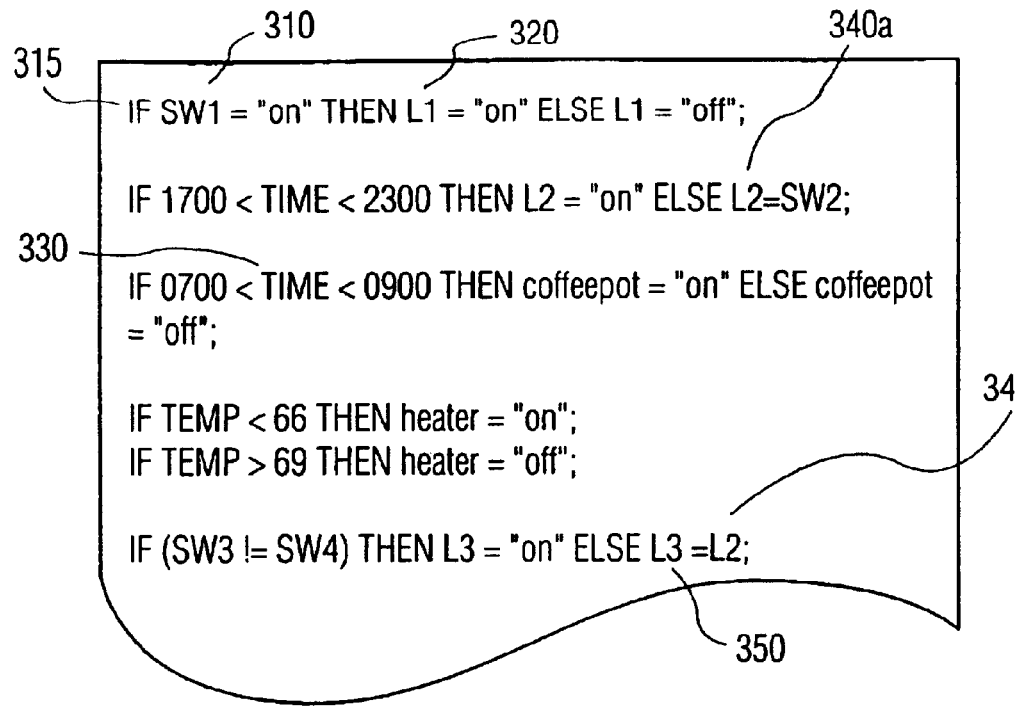
FIGS. 3A and 3B illustrates an example visual presentation of a control network corresponding to a control script, in accordance with this invention.
Figure 3B:
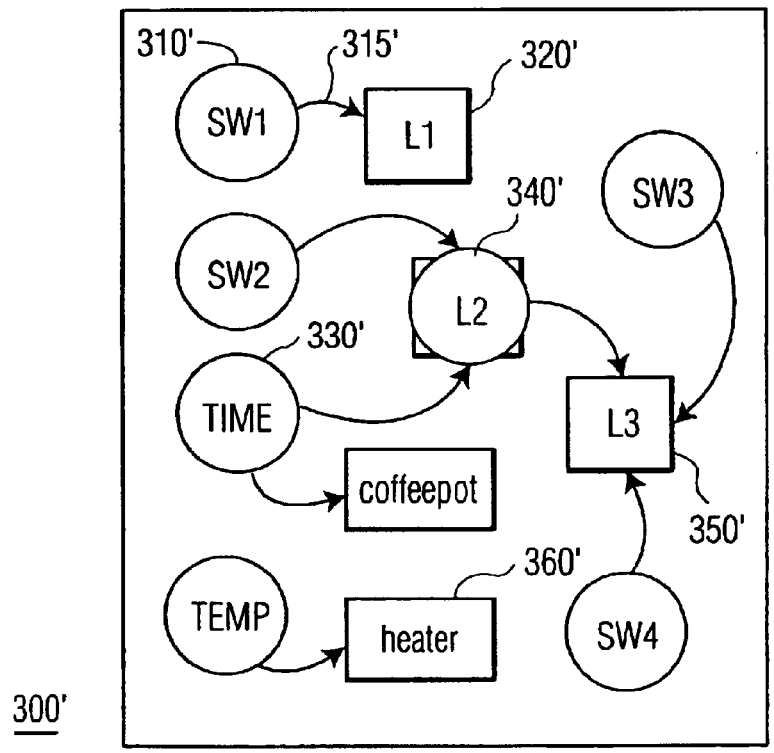

FIGS. 3A and 3B illustrates an example visual presentation of a control network 300' corresponding to a control script 300. The example control script 300 is presented in a general form, as a series of "IF-THEN-ELSE" statements, although the particular form of the script will depend upon the particular script language used. As illustrated in the Background of the Invention, different control systems use different methods of describing control relationships in a script. The Home-API system uses an "AddRoute (D1, S1, D2, S2)" function statement to describe the control of device D2 based on the state of D1. As is evident to one of ordinary skill in the art, the above AddRoute function statement can be equivalently defined as: "If D1=S2, then D2=S2".

The modeling system 120 in FIG. 1 is configured to parse and process the particular script language used, to identify control and controlled elements, and their relationships. In the example script 300, the modeling system 120 will identify elements that are contained in the "IF" portion of the IF-THEN-ELSE statements as control elements, and elements on the left-hand side of an assignment statement as controlled elements, and elements on the right-hand side of an assignment statement as a control element. In a Home-API system, the modeling system 120 will identify the first argument of each AddRoute statement as a control element, and the third argument of each AddRoute statement as a controlled element. The parsing and processing of scripts to identify control and controlled elements for particular script languages will be evident to one of ordinary skill in the art in view of this disclosure.

Circles are used in FIG. 3B for control elements, and rectangular blocks are used for controlled elements. As illustrated in FIG. 3A, "SW1" 310, being within the IF portion of an IF-THEN-ELSE statement 315, is a control element, and is indicated as a circle 310' in the visual representation 300' of FIG. 3B. "L1" 320, being on the left-hand side of an assignment statement, is a controlled element, and is indicated as a rectangle 320' in the visual representation 300' of FIG. 3B. Because the element "SW1" 310 is related to the element "L1" 320 via the first IF-THEN-ELSE statement 315 in the script 300', the control element SW1 310' is shown as controlling the controlled element L1 320', via the directed arrow 315'.

The control elements may be actual elements in a user's network, or they may be control parameters, such as the TIME 330 argument in the script 300, and the corresponding TIME control element 330' in the visual representation 300'. Some elements may be both control elements as well as controlled elements, such as the L2 control/controlled element 340' in FIG. 3B. The argument "L2" 340a, on the left-hand side of an assignment statement, is a controlled element, controlled by the TIME parameter 330. The same argument "L2", at 340b, is also on the right-hand side of an assignment statement, and therefore is a control element, in that its state, and the state of "SW3" and "SW4" determines the state of argument "L3" 350. The control/controlled element L2 340' is illustrated in FIG. 3B as being controlled by elements SW2 and TIME, and as controlling element L3 350'. Each argument in the script 300 is similarly mapped to control and control elements in the visual representation 300'.

As noted above, being provided the visual representation 300', an observant user can readily identify anomalous links and relationships. For example, a link between a lamp element L3 350' and the heater element 360' would be odd, and may indicate the effect of a virus. Additionally, algorithmic means can be applied to identify anomalies in the configuration of the network corresponding to the network description that is used to create the representation 300'. For example, each controlled element should have at least one corresponding control element, and each control element should have at least one controlled element. As the visual representation is being created, other potential problems, such as a control network that contains embedded "loops" may also be highlighted as questionable.

Figure 4:
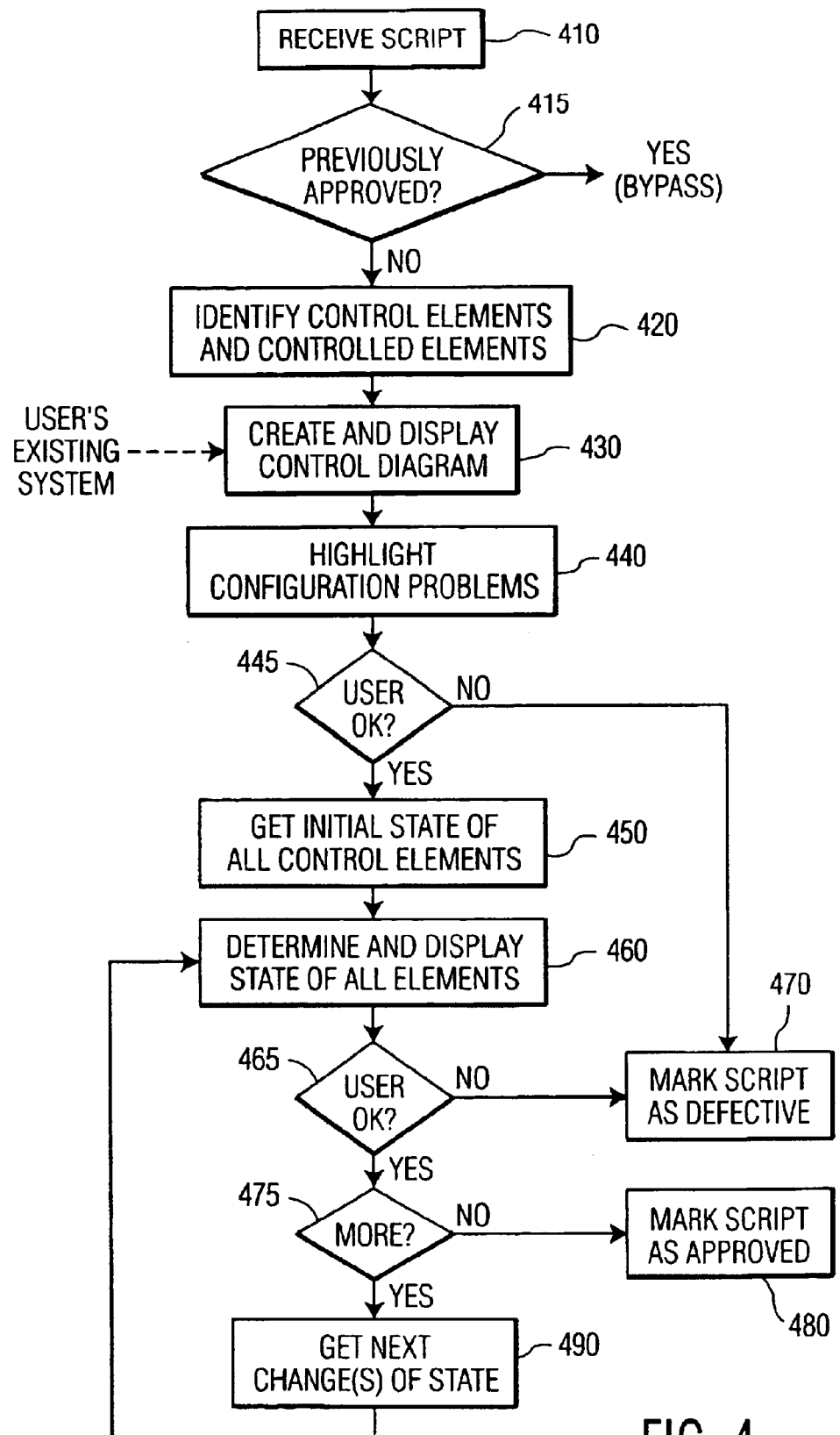
FIG. 4 illustrates an example flow diagram of a visual anti-virus system in accordance with this invention.

FIG. 4 illustrates an example flow diagram of a visual anti-virus system in accordance with this invention. At 410, a script is received, and subsequently processed unless, at 415, it is determined to have been previously approved, or otherwise filtered, as discussed above with regard to the filter 110 of FIG. 1. At 420, the control and controlled elements are identified, and a control diagram is created, at 430, as discussed above with regard to the modeling 120 and rendering 130 systems of FIG. 1. Optionally, at 430, the user's existing system is also used to create the control diagram. At 440, potential configuration problems, such as unconnected elements, embedded loops, inconsistencies between the user's existing system and the scripted system, and so on, are also presented, preferably using some form of highlighting to attract a user's attention. At 445, a user is given the option of approving or disapproving the control structure as visually presented. If the user disapproves the displayed control structure, the script is marked as defective, at 470.

In accordance with another aspect of this invention, the system 100 of FIG. 1 includes a simulation system 150 that visually presents the state of each element in the representation 300' of FIG. 3. The blocks 450–490 of FIG. 4 illustrate an example flow of the simulation system 150 of FIG. 1. At 450, the initial state of all control elements is provided to the simulation system 150, via a definition of an initial "stimuli" of control element states. The resultant state of each controlled element, based on the contents of the suspect control script, is determined, and displayed to the user. The display may be a text listing of each element's resultant state, or preferably, for example, an illustration of each element's state at each element in the displayed representation 300' of FIG. 3B. The user is given the option of approving or disapproving the script, based on the displayed state of each element, at 465. If the user disapproves, the script is marked as defective, at 470.

The user is also given the option of ceasing the simulation at any time, at 475. If the simulation is continued, one or more element state values are changed, at 490, and the evaluation and display loop 460–475 is repeated. Preferably, the element state values are changed via changes to control elements only, rather than a direct change to a state of a controlled device, which may not be realizable via the control options provided by the suspect control script. As each change of control is input, the resultant controlled states are displayed for the user's assessment. In a preferred embodiment, the simulation system 150 includes 'fail safe' processes that prevent the simulation from becoming locked in a continuous loop, and other abnormal behavior.

As noted above, by presenting a visual representation of the effects of various control inputs, aberrant behavior, such as the activation of a garage door opener whenever a refrigerator door is opened, is readily apparent.

In a preferred embodiment of this invention, the input stimuli to the simulation system 150 is collected by emulating the user interface that is provided to actually control the control element. As noted above, the UPnP protocol allows a device to identify a 'presentation' page that provides the user interface for controlling the device. In a preferred embodiment, the same page is used to collect a user's input while the network is being simulated. These and other techniques for providing user input stimuli will be evident to one of ordinary skill in the art in light of this disclosure.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the modeling system 120 and/or the rendering system 130 may be configured to provide 'hierarchical' representations of control scripts, particularly those scripts that include "macros" or other structured language techniques. These and other system configuration and optimization features will be evident to one of ordinary skill in the art in view of this disclosure, and are included within the scope of the following claims.

What is claimed is:

1. A system for detecting a potential virus in a control script, comprising:
    a modeling system that is configured to create a model of a control system, based on a network description corresponding to a control structure described by said control script, said network description comprising a combination of control and controlled devices and their interconnections, and
    a rendering system that is configured to provide a visual representation of the model of the control system, wherein said visual representation facilitates the detection of said potential virus to a user.

2. The system of claim 1, further including
    a display device that is configured to present the visual representation of the model of the control system to a user.

3. The system of claim 2, wherein
    at least one of the modeling system and the rendering system is located at a remote site from a location of the display device.

4. The system of claim 1, wherein
    the control script employs representations of said control and controlled devices that conform to at least one of: a USB standard, a Bluetooth standard, a HAVi standard, a Home API standard, a HomeRF standard, an X-10 standard, a UPnP standard, and a Jini standard.

5. The system of claim 1, further including
    a script filter that is configured to identify suspect scripts, and
    wherein the control script corresponds to one of the suspect scripts.

6. The system of claim 1, further including
    a simulation system that is configured to provide a resultant state of one or more devices in the model of the control system, based on one or more input states.

7. The system of claim 6, wherein
    the rendering system is further configured to include the resultant state in the visual representation of the control system.

8. The system of claim 6, wherein
    the control script includes a presentation of controls associated with one or more devices in the control system, and
    the simulation system is further configured to receive the one or more input states based on the presentation of controls.

9. The system of claim 1, further including
    a configuration verification system that is configured to identify anomalous configurations in the model of the control system.

10. The system of claim 9, wherein
    the model of the control system is also based on information regarding an existing control system, and
    the configuration verification system is further configured to identify inconsistencies between the information that is contained in the control script, and the information regarding the existing control system.

11. A method of detecting a potential virus in a control script comprising the acts of:
    creating a model of a control system, based on a network description corresponding to a control structure described by said control script, said network description comprising a combination of control and controlled devices and their interconnections,
    rendering the network description to form an image of the combination of elements,
    wherein said rendering facilitates the detection of said potential virus to a user.

12. The method of claim 11, further including
    presenting the image on a display device for review by a user.

13. The method of claim 11, wherein
    the control and controlled elements conform to at least one of: a USB standard, a Bluetooth standard, a HAVi standard, a Home API standard, a HomeRF standard, an X-10 standard, a UPnP standard, and a Jini standard.

14. The method of claim 11, further including
    filtering a source of scripts to provide the control script.

15. The method of claim 11, further including
    determining a resultant state of one or more devices identified in the control script, based on one or more input states.

16. The method of claim 15, further including
    rendering the resultant state of the one or more devices to facilitate a review by a user.

17. The method of claim 15, wherein
    the control script includes a presentation of controls associated with one or more devices in the control system, and
    the method further includes
    receiving the one or more input states based on the presentation of controls.

18. The method of claim 11, further including
    identifying anomalous configurations in the network description.

19. The method of claim 18, wherein
    the network description also includes a description of an existing control system, and
    the method further includes
    identifying inconsistencies between the control script, and the description of the existing control system.

20. For use in a service provided anti-virus system, a method of facilitating purchase of items and/or services, comprising the acts of:

obtaining an inventory of a user's equipment, to facilitate modeling of a control script as a service to the user, constructing a user equipment profile based on the obtained inventory of user's equipment, and communicating with the user to facilitate the purchase of said items and/or services based on the user's equipment profile.

21. The method of claim 20, further including:

providing a simulation of the control script, based on the inventory of the user's equipment.

22. A method of creating a customer base, the method comprising:

specifying a user's inventory of equipment to a server on a data network;

modeling the control of the equipment, based on one or more scripts; and storing information in the customer base, based on the user's inventory of equipment.

\* \* \* \* \*